J. M. O'NEALL.
Band-Cutting Feeders for Thrashing-Machines.
No. 209,580. Patented Nov. 5, 1878.
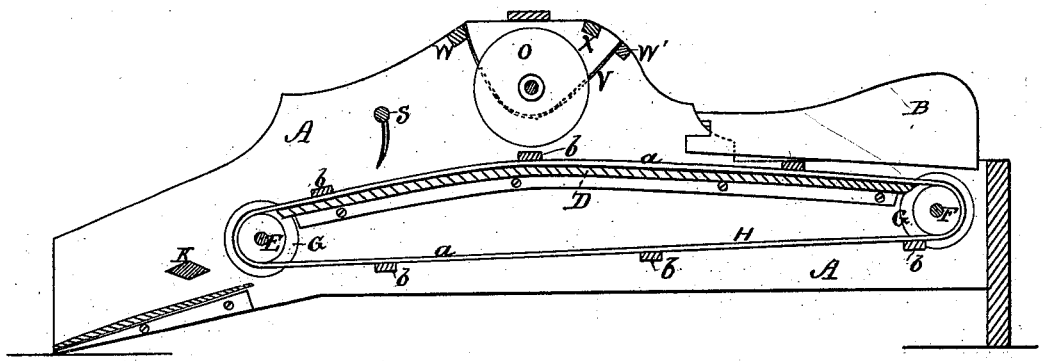
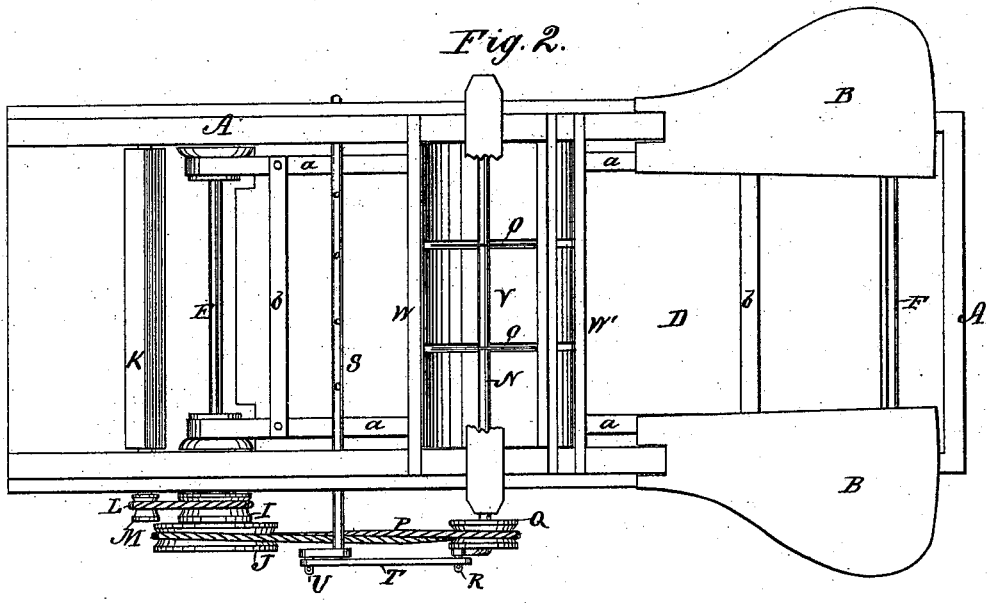

UNITED STATES PATENT OFFICE.

JAMES M. O'NEALL, OF FORT WORTH, TEXAS.

IMPROVEMENT IN BAND-CUTTING FEEDERS FOR THRASHING-MACHINES.

Specification forming part of Letters Patent No. 209,580, dated November 5, 1878; application filed March 21, 1878.

*To all whom it may concern:*

Be it known that I, JAMES M. O'NEALL, of Fort Worth, in the county of Tarrant and State of Texas, have invented a new and Improved Band-Cutting Feeder for Thrashing-Machines; and I do hereby declare that the following is a full, clear, and exact description of the same.

The object of my invention is to provide an improved machine for cutting the bands of gavels or bundles of grain, and feeding the same to the cylinder of a thrasher.

The invention relates more particularly to a guard under the shaft of the rotary cutters, and the form and arrangement of the bed of the endless carrier.

In the accompanying drawing, forming part of this specification, Figure 1 is a vertical longitudinal section of the machine, and Fig. 2 is a plan view of the same.

A represents the frame of the machine, provided with wings B B and a curved bed, D, having at its ends the shafts E F, carrying pulleys G G, for the endless carrier H, which consists of belts a a and cross-slats b. The shaft E carries the pulleys I J also, the former serving to give motion to the shaker K through the medium of the belt L and pulley M, and the latter to the shaft N of the circular cutters O O by means of the belt P and pulley Q. The end of the shaft N is formed into a crank, R, to give motion to the rake S by means of the pitman T and the crank U.

Beneath the cutter-shaft N is a guard, V, extending upward to cross-bars W W', attached to the sides of the frame, and at X is another cross-bar, acting, in conjunction with the guard proper, to prevent danger to the operators by accidental contact with the band-cutters O O. The guard V also prevents loose straw from being caught up and wound around the shaft N.

In operating the machine, the bundles or gavels of grain are laid on the wings or tables B B, and from thence fall or are placed upon the bed D, and carried forward by the slats b under the cutters O, which may either have a plain cutting-edge or be serrated, as desired; but I prefer the latter. After passing the cutters, the bundles are operated on by the rake S, which, by its rapid vibrating motion, opens the grain for the more ready operation of the thrashing-machine. After leaving the rake, the opened bundles pass over the shaker K, which, in its turn, still further opens and shakes the grain, so that when it reaches the thrashing-cylinder it is in the best possible condition for being operated on by the latter. The curved bed enables the carrier to pass over the bed with but little friction, as the carrier has little friction with the bed, except at that portion where the most of the work is required—namely, directly under the cutters.

If preferred, the reciprocating rake and the rotary shaker may receive endwise motions by means of cams and levers, as in my Patent No. 197,659.

The shaker alternately raises and lowers the grain, and also helps to feed it to the thrasher.

What I claim is—

1. The combination, with endless carrier, the curved bed, the shaft N, and cutters O, of the convex guard V, constructed and arranged substantially as described.

2. In combination with the band-cutters O and carrier H, the fixed convex bed D, having its highest point or convexity immediately beneath the cutters, as shown and described.

JAMES M. O'NEALL.

Witnesses:
C. E. RATCLIFFE,
R. H. SHANKLIN.